April 3, 1962

E. J. HILLIARD, JR 3,028,554

AUTOMATIC VARIABLE SLICER CIRCUIT

Filed Sept. 28, 1959

INVENTOR.
EDWARD J. HILLIARD, JR.

BY

ATTORNEYS

United States Patent Office 3,028,554
Patented Apr. 3, 1962

3,028,554

AUTOMATIC VARIABLE SLICER CIRCUIT

Edward J. Hilliard, Jr., Portsmouth, R.I., assignor to the United States of America as represented by the Secretary of the Navy Filed Sept. 28, 1959, Ser. No. 843,027
8 Claims. (Cl. 328—117)
(Granted under Title 35, U.S. Code (1952), sec. 266)

The invention described herein may be manufactured and used by or for the Government of the United States of America for governmental purposes without the payment of any royalties thereon or therefor.

This invention relates to a pulse amplitude discriminating circuit and more particularly to a method of and a demodulator for removing pulse information signals from a variable amplitude modulated carrier.

The usual pulse modulated wave comprises a carrier wave modulated by a train of spaced pulses of energy, at a predetermined frequency. These modulating pulses are representative of the intelligence being transmitted. The waveform of the transmitted signal may suffer appreciable distortion during transmission, for example due to the loss in magnitude. In order to separate the desired pulse signal from the carrier it is known to reshape the pulse signal by effecting pulse slicing at a level between the two levels of the pulse code signal itself. These prior art slicer circuits use a fixed bias voltage on the slicing diode, and therefore require a fixed amplitude carrier for operation. The primary disadvantage of this type of circuit is that if the carrier varies, a manual adjustment of the bias voltage must be made.

It is therefore the object of the present invention to provide a variable slicer circuit that is operable with weak carrier signals.

It is another object of the invention to provide a circuit adapted for operation with incoming signals when the carrier wave varies throughout a wide range of amplitudes.

It is still another object of the invention to provide a circuit that is constructed so that the bias voltage will automatically be adjusted by the incoming composite signal.

It is a further object of this invention to provide a bias voltage that is automatically adjusted by the incoming composite signal so that the slicing level bias voltage follows the increase or decrease in carrier level.

Further objects and advantages of the invention along with an understanding of the principles of operation thereof, will be made clear from the following description when considered in connection with the accompanying drawings, in which.

Figure 1:
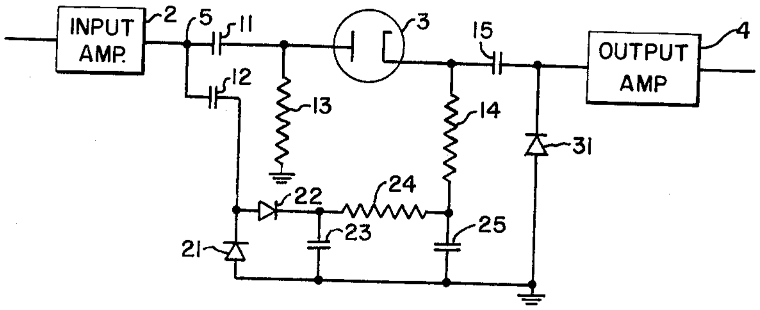
FIG. 1 is a schematic circuit diagram embodying the invention.
Figure 2:
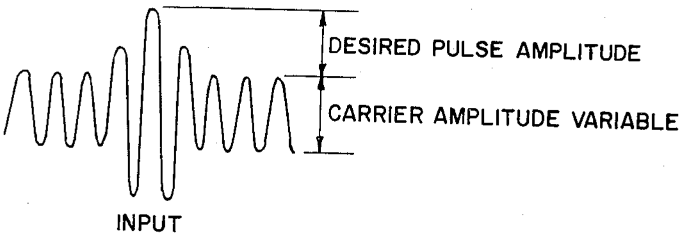
FIG. 2 is a waveform diagram of the input signal received by the input amplifier.
Figure 3:
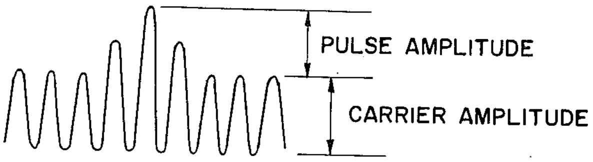
FIG. 3 is a waveform taken at point 5 of FIG. 1 showing the output signal of the input amplifier.

Referring now to the drawings and in particular to FIG. 1, wherein the input amplifier 2 drives the floating slicer through condensers 11 and 12 with a signal composed of a carrier modulated in amplitude only. The input amplifier receives a signal as shown in FIG. 2. The circuit of the amplifier clamps the signal negatively so that the output signal as seen at point 5 of FIG. 1 has a waveform as shown in FIG. 3.

The lower section of the circuit shown in FIG. 1 is a voltage doubling circuit having a long time constant which converts the carrier signal amplitude to a direct current which will be proportional to the average peak to peak value of the carrier. Rectification is accomplished by diodes 21 and 22. The direct current is filtered by capacitor 23 and resistor 24. This direct current is used to charge the condenser 25 which establishes the slicing potential on the cathode of the slicing diode 3. The duration of the pulse is assumed to be short compared to the interval between pulses so that a pulse will not radically alter the direct current voltage level established at condenser 25. The effect of the pulse on the direct current level will also be minimized by the low impedance of condenser 25 and the high impedance of the load resistor 14 to the applied pulse. When the carrier decreases capacitor 25 can discharge through the back resistance of diodes 21, 22 and resistor 24.

Figure 4:
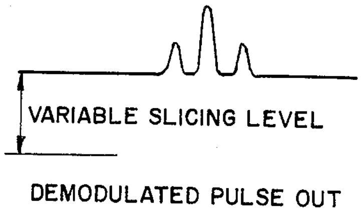
FIG. 4 is a waveform diagram of the demodulated output signal of the circuit shown in FIG. 1.

The upper section of the floating slicer circuit is a diode 3 so biased by capacitor 25 that only those pulses (as shown in FIG. 4) which exceed the value of voltage established by the lower part of the circuit can pass and be developed across the output resistor 14. Resistor 13 provides a discharge path for capacitor 11.

The sliced output signal pulse is fed through capacitor 15 into the output amplifier 4. The diode 31 clamps the pulse to ground potential so that the full amplitude may be used to drive the output amplifier.

FIGS. 2, 3 and 4 disclose typical waveforms of signals actually obtained in an embodiment of this circuit wherein the carrier was operated at 60 cycles per second and the modulation was approximately 3 cycles wide at repetition rates of from 10 cycles per second down to zero cycles per second.

It is not intended that the present invention be restricted to arrangements for slicing signals which carry pulse code modulation only but the invention may be modified for use in many applications. For example, the circuit without the clamping diode 31 can be adapted for use as a variable limiter-circuit for FM receiver work. Since limiting level follows signal fade-out, AVC can be eliminated with the use of this invention since this circuit can provide the required variable gain feature. The IF stages will no longer have to do the limiting and straight thru amplifiers can be employed.

It is obvious that applicant's circuit can demodulate pulse signals in applications where, because of the nearness of carrier and pulse repetition frequencies, conventional diode detector methods could not be applied.

Having thus described the construction and operation of the invention, those features believed descriptive of its nature are defined with particularity in the appended claims.

What is claimed as new and desired to be secured by Letters Patent of the United States is:

1. An automatic variable slicer circuit for a modulated carrier wave of electromagnetic energy comprising a detector for detecting the modulations of the carrier, a biasing circuit for said detector connected in parallel with said detector, means in said biasing circuit responsive to the variation of said carrier level to vary the bias on said detector whereby the modulated carrier is demodulated.

2. A slicer circuit of claim 1 wherein the biasing circuit comprises a voltage doubling means, a filter means and a capacitor voltage smoothing means serially connected respectively, the output of said voltage smoothing means being fed thru a resistor to the cathode of the detector thereby biasing said detector so that the output is substantially independent of the amplitude variation of the applied carrier wave.

3. The slicer circuit of claim 1 wherein the detector comprises a diode including an anode and a cathode, the modulated carrier wave being impressed on said anode, the biasing voltage being impressed on said cathode, whereby the output of said diode is substantially independent of the amplitude variations of the carrier wave.

4. An automatic variable slicer circuit for a modulated carrier wave comprising an input amplifier, a diode detector having an anode and cathode, the anode of said detector being electrically connected to said input amplifier, a biasing circuit for said detector electrically connected to said input amplifier and in essentially parallel relation to said detector, means in said biasing circuit responsive to variation of said carrier wave to vary the bias on said detector, an output amplifier electrically connected to the cathode of said detector, thru a blocking capacitor, a clamping circuit electrically connected between said output amplifier and said blocking capacitor whereby the output of said slicer circuit is substantially the amplitude variation independent of the carrier wave.

5. A slicer circuit of claim 4 wherein the means in the bias circuit comprises a voltage doubling means for providing a biasing voltage and for rectifying the modulated carrier wave, a filter means for filtering the direct current and a capacitor smoothing means for limiting the bias voltage to the instantaneous peak to peak value of the carrier wave, said voltage doubling means, filter means and smoothing means being serially connected in the order named.

6. An automatic demodulating circuit for a modulated sinusoidal carrier wave comprising, an input amplifier, a first capacitor connected in series with said input amplifier, a diode detector having an anode and cathode, the anode of said detector being serially connected to said first capacitor, a second capacitor connected in series with said input amplifier, a biasing circuit for generating a biasing voltage across said detector, said biasing circuit having one end connected to said input amplifier through said second capacitor and the other end connected to the cathode of said detector, means in said biasing circuit responsive to any variation in the sinusoidal carrier wave for varying the bias on said detector, a blocking capacitor, an output amplifier electrically connected to the cathode of said detector through said blocking capacitor, a ground clamping circuit electrically connected between said output amplifier and said blocking capacitor whereby the signal input to said output amplifier is only the demodulated carrier wave signal.

7. The automatic demodulating of claim 6 wherein the means in said biasing circuit includes a voltage doubling means connected to said second capacitor for rectifying the sinusoidal carrier wave, a filter means electrically connected to said voltage doubling means for filtering the direct current from the voltage doubling means, a capacitor means electrically connected to said filter means for smoothing and limiting the biasing voltage to the instantaneous peak-to-peak voltage of the carrier, and a resistor electrically connected between said capacitor means and the cathode of said detector.

8. An automatic demodulating circuit for removing the modulating signal from a varying sinusoidal carrier wave comprising a diode means having a cathode and an anode for detecting the modulated signal on the sinusoidal carrier wave, a biasing means connected across said detector for removing the carrier wave, said biasing means including a voltage doubling means connected to the anode of said diode means for rectifying the carrier wave, a filter means connected to said voltage doubling means for filtering the output thereof, a capacitor means connected to said filter means for smoothing and limiting the bias voltage to the instantaneous peak-to-peak value of the carrier wave, and a resistor connecting the capacitor means to the cathode of said diode means whereby only the modulated signal is emitted by the diode means.

References Cited in the file of this patent

UNITED STATES PATENTS

| | | |
|---|---|---|
| 2,338,412 | Dallas | Jan. 4, 1944 |
| 2,890,335 | Gibbon | June 9, 1959 |
| 2,896,077 | Brandt | July 21, 1959 |
| 2,900,501 | Momberg | Aug. 18, 1959 |